(12) United States Patent
Richter

(10) Patent No.: US 12,604,161 B2
(45) Date of Patent: Apr. 14, 2026

(54) MISSION CRITICAL PUSH-TO-TALK OPERATIONS

(71) Applicant: peiker Holding GmbH, Bad Homburg (DE)

(72) Inventor: Lutz P. Richter, Mixdorf (DE)

(73) Assignee: peiker Holding GmbH, Bad Homburg (DE)

( * ) Notice: Subject to any disclaimer, the term of this patent is extended or adjusted under 35 U.S.C. 154(b) by 308 days.

(21) Appl. No.: 18/346,295

(22) Filed: Jul. 3, 2023

(65) Prior Publication Data

US 2024/0015484 A1      Jan. 11, 2024

(30) Foreign Application Priority Data

Jul. 5, 2022    (DE) ..................... 10 2022 116 766.6

(51) Int. Cl.
*H04W 4/10*          (2009.01)

(52) U.S. Cl.
CPC ..................................... *H04W 4/10* (2013.01)

(58) Field of Classification Search
CPC ......... H04W 4/10; H04W 76/45; H04W 4/08;
H04W 4/90; H04W 88/04; H04W 76/50;
H04W 4/02; H04W 8/005; H04W 60/04;
H04W 76/11; H04W 4/029; H04W 4/24;
H04W 76/14; H04W 76/40; H04W 60/00;
H04W 84/042; H04W 76/16; H04W
12/08; H04W 48/16; H04W 76/10; H04W
80/10; H04W 88/06; H04W 88/16; H04W
12/06; H04W 4/80; H04L 65/4061; H04L
65/1073; H04L 65/1016; H04L 65/1104;

H04L 65/80; H04L 65/1069; H04L
12/1407; H04L 65/1083; H04L 12/1432;
H04L 12/1827; H04L 41/5067; H04L
45/22; H04L 61/4535; H04L 65/00; H04L
65/1095; H04L 65/403; H04L 65/65;
H04L 67/51; H04L 69/40
See application file for complete search history.

(56) References Cited

U.S. PATENT DOCUMENTS

| | | | | |
|---|---|---|---|---|
| 10,341,823 | B2 * | 7/2019 | Vempati .................. | H04W 4/08 |
| 11,197,131 | B2 * | 12/2021 | Nerlikar ................ | H04W 76/45 |
| 2008/0171567 | A1 | 7/2008 | Kossi et al. | |
| 2017/0048894 | A1 * | 2/2017 | Choi ....................... | H04W 4/08 |
| 2017/0251029 | A1 | 8/2017 | Atarius et al. | |
| 2017/0332311 | A1 | 11/2017 | Suzuki et al. | |
| 2018/0192258 | A1 * | 7/2018 | Vempati .................. | H04W 4/10 |
| 2019/0335328 | A1 * | 10/2019 | Ben Henda ........... | H04W 12/04 |

(Continued)

FOREIGN PATENT DOCUMENTS

EP         3 183 898 B1      6/2019

*Primary Examiner* — Golam Sorowar
(74) *Attorney, Agent, or Firm* — BURR PATENT LAW, PLLC

(57) ABSTRACT

A system for providing communications services, comprising a first wireless communication network with a MCPTT infrastructure suitable for MC PTT communication and a relay which transmits the communication to a second wireless network in which terminals which participate in MCPTT communication are registered as MCPTT clients, characterized in that the relay takes over the data exchange necessary for setting up MCPTT voice communication, avoiding the MCPTT clients being involved in the data exchange with the MCPTT server.

3 Claims, 5 Drawing Sheets

(56)          References Cited

U.S. PATENT DOCUMENTS

2019/0380010 A1      12/2019  Yang et al.
2022/0038984 A1       2/2022  Vutukuri et al.
2022/0346184 A1*   10/2022  Ramamoorthy  ......  H04W 76/10

* cited by examiner

MISSION CRITICAL PUSH-TO-TALK OPERATIONS

This application claims the benefit under 35 USC § 119(a)-(d) of German Application No. 10 2022 116 766.6 filed Jul. 5, 2022, the entirety of which is incorporated herein by reference.

FIELD OF THE INVENTION

The present invention relates to mission critical push-to-talk operations.

BACKGROUND OF THE INVENTION

Push-to-talk, an immediate voice communication within a group, is the prerequisite and basis of any communication for authorities and organizations with security tasks.

Both, analog communication systems of the past and digital communication systems (TETRA) currently in use, provide stable, reliable and nationwide communication thanks to the high transmission power of base stations and terminals.

Due to the growing need for broadband communication of these organizations, the transition to communication systems with the possibility of transmitting large amounts of data in addition to voice communication is taking place; to standardized systems that have proven and established themselves in public and commercial use (LTE/5G).

The use of 3GPP-standardized terminals by authorities and organizations with security tasks means that nationwide coverage can only be achieved through a significantly larger number of base stations; but this is neither sufficient nor economically viable.

U.S. Patent Application Publication No. 2008/0171567 A1 describes "Techniques to increase coverage of push-to-talk wireless networks"; it says: a technique may include forwarding data to a remote push-to-talk (PTT) wireless network via an intermediary device of an intermediary wireless network. US 2008/0171567 A1 claims that a local push-to-talk (PTT) wireless network and a remote PTT wireless network is connected via an intermediary wireless network, to enable a PTT functionality in both networks. The PTT functionality is realized by an "always on" connection, where typically half-duplex communication can be initiated to both individuals and talk groups simply with the push of a button on a mobile device. The members (or devices) of such a PTT wireless network are capable of communicating with each other directly on a peer-to-peer basis. The intermediary wireless network operates as an interface between these PTT wireless networks; it exchanges data between such wireless PTT wireless networks. Every PTT network (or subnetwork) needs an intermediary device, to receive data from a device within PTT network, and forward the data on to a device in PTT wireless network via the intermediary wireless network. A service, as it is claimed in US 2008/0171567 A1, is similar to the traditional "walkie talkie" service, and not able to fulfill mission-critical push-to-talk application requirements.

Mission Critical Push-to-Talk (MCPTT) refers to the push-to-talk functionality that meets the requirements of mission-critical, secure voice communication. High availability and reliability, low latency, support for group and one-to-one calls, speaker identification, direct communication between devices and emergency calls play a decisive role. To achieve this, appropriate precautions must be taken in the infrastructure of the communication network.

A MCPTT Server is essential for all MCPTT applications, as described in EP 3 183 898 B1 and in ETSI standards ETSI TS 122 179-MCPTT over LTE, ETSI TS 123 379—functional architecture and information flows MCPTT; it controls the call sessions, uses these sessions to make outgoing calls and also uses pre-established sessions to terminate incoming calls.

Each terminal/smartphone is enabled to participate in this communication by implementing MCPTT client software. MCPTT client: An instance of an MC service client that provides the client application function for the MCPTT service (ETSI TS 122 179).

MCPTT communications are possible also by using local WiFi connectivity as it is described in EP 3 183 898 B1/U.S. Provisional Application No. 62/039,272 "Relay-mode and direct-mode operations for push-to-talk-over-cellular using WiFi technologies". It claims a system and method for relay-mode and direct-mode operations and provides a server architecture with a flexible client strategy.

DETAILED DESCRIPTION OF THE INVENTION

The present invention describes and claims how the "extension" of an LTE network by a "tactical WiFi bubble" (second wireless network [101]) around an access point still guarantee the time-critical flow of a group communication.

When initiating a PTT call by a PTT enabled smartphone/terminal [2], based on the MCPTT client application [202], a "group call request" is transferred via the LTE network to the MCPTT server [600]; the server transfers a "group call request" to each group member/smartphone [1, 3, 4] separately. Each group member will answer with a "group call response" message to the server [600], thereupon the server transmits the "group call notify" message to the client.

Figure 1:
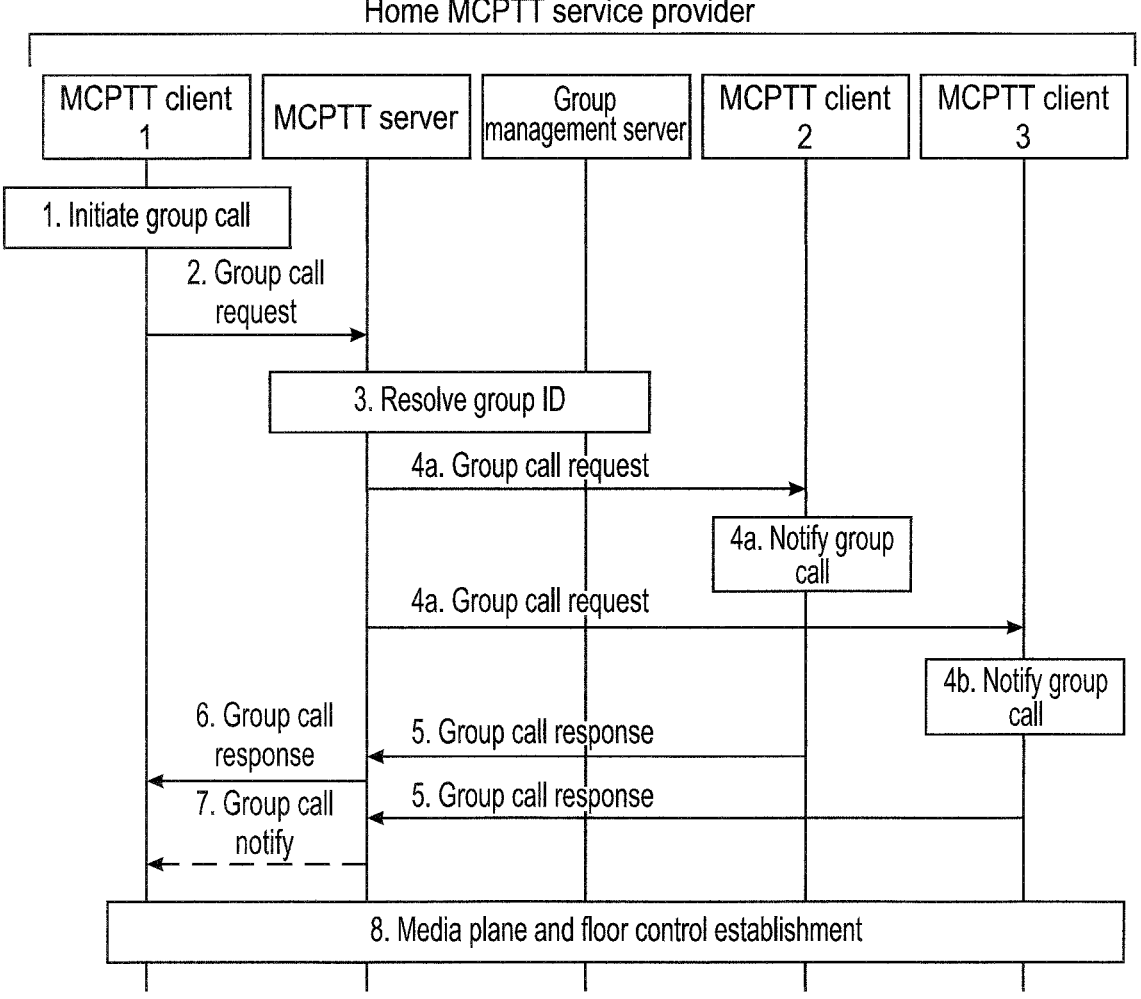
FIG. 1 shows a pre-arranged group call setup/ETSI TS 23 379.
Figure 2:
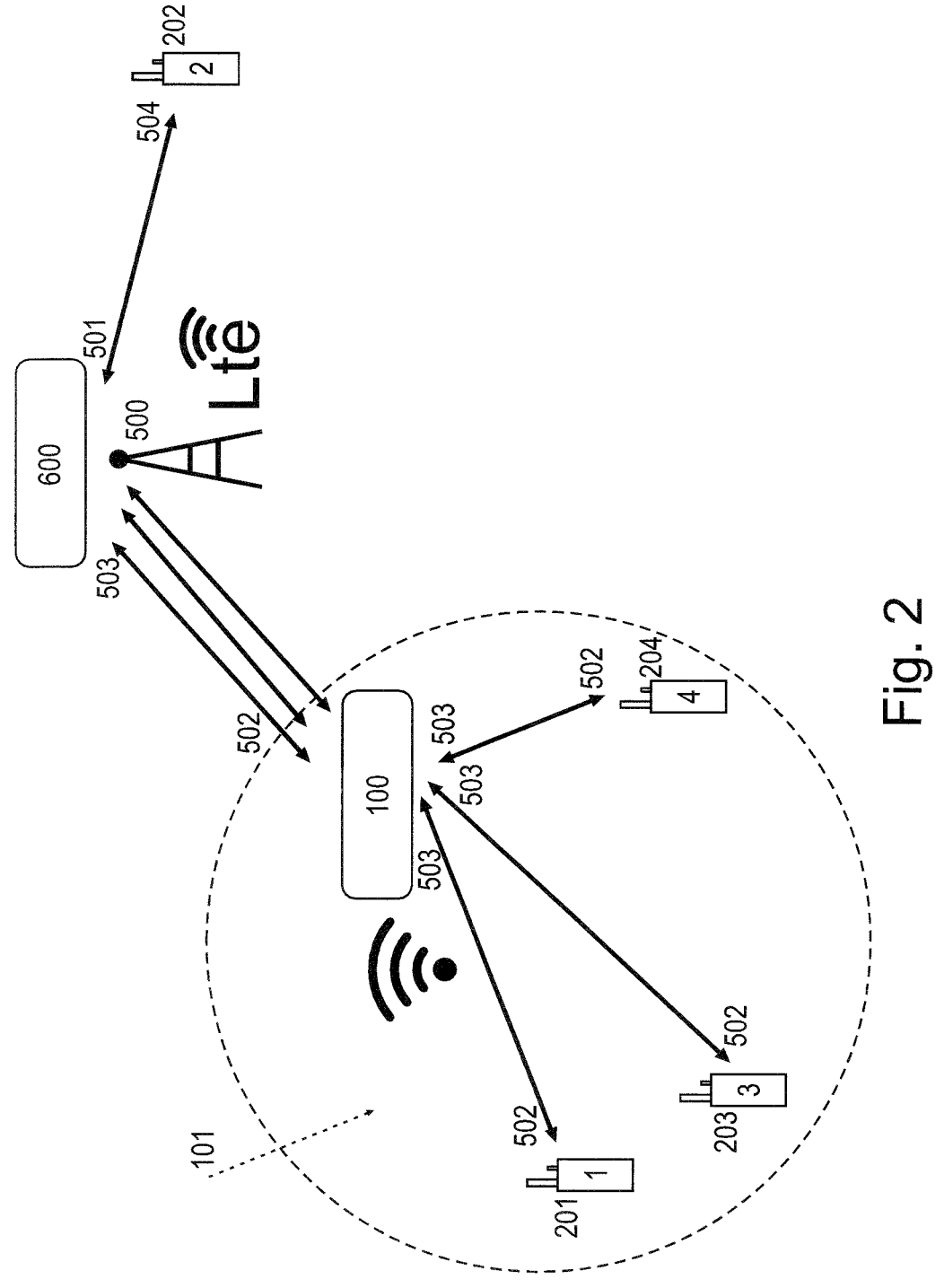
FIG. 2 shows a MCPTT group call notification procedure.

The client [202], implemented in terminal [2], who has triggered the call gets the release for the call (ETSI TS 123 379—"Functional architecture and information flows to support Mission Critical Push-To-Talk (MCPTT)"); FIG. 1 shows that, based on ETSI TS 123 379/pre-arranged group call setup. This means that all terminals [1, 3, 4] that are in a WiFi bubble [101] are polled separately: "The receiving MCPTT clients accept the group call request, and a group call response is sent to the group host MCPTT server. This response may contain an acknowledgement." (FIG. 2)

Figure 3:
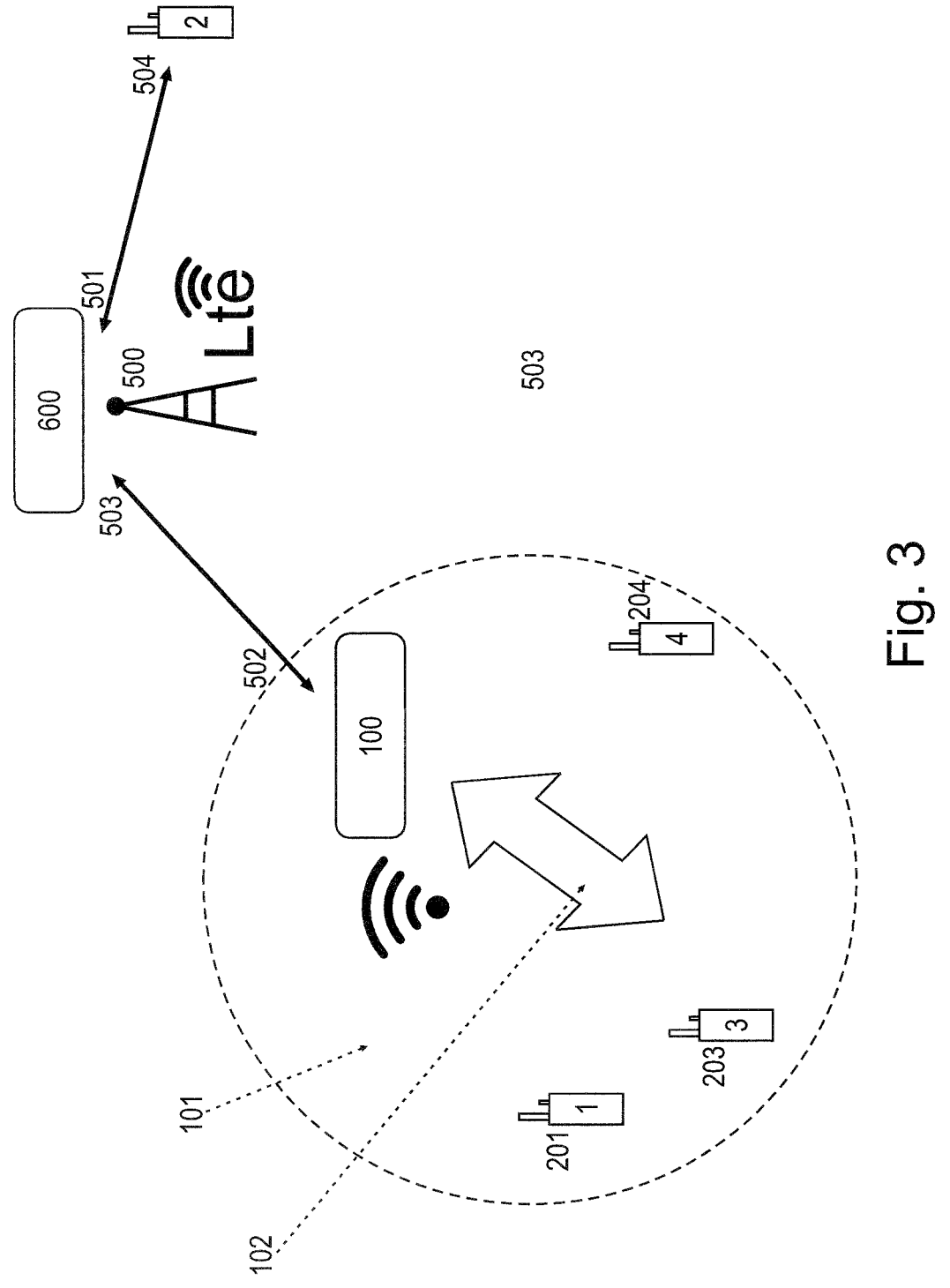
FIG. 3 shows a set up procedure handled by the access point [100]

Based on the invention the process is shortened by terminating the first request [502], at the access point [100] by transmitting the "group call response" answer for all clients [201, 203, 204], connected to the access point [100], and the access point [100], opens the broadcast channel within the WiFi access point for the call (FIG. 3).

Figure 4:
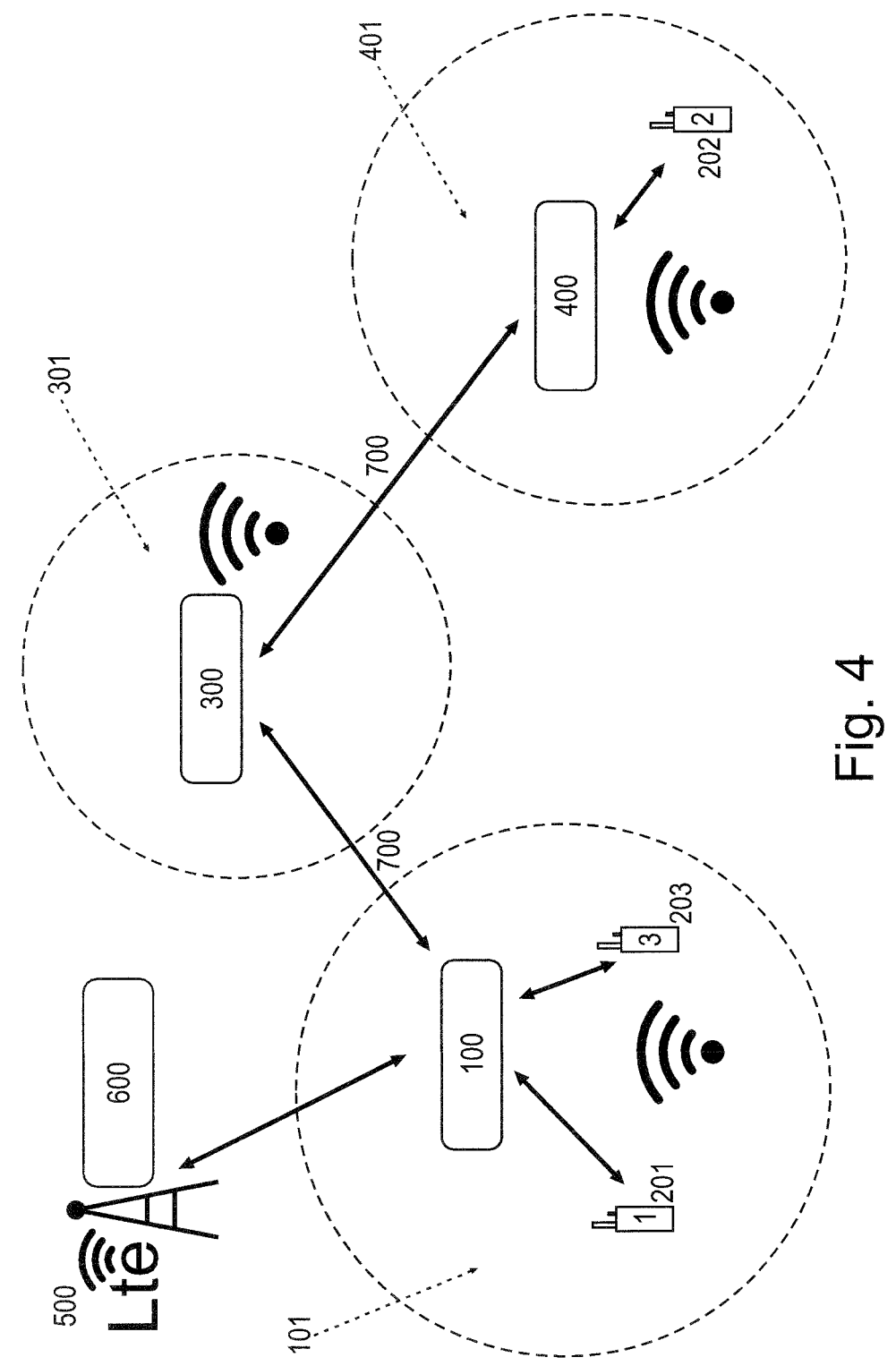
FIG. 4 shows a relay function.

In a mobile network of access points with relay functionality, even if only one of several access points [100, 300, 400] has access to the LTE network [500] and the MCPPT server [600], this special access point [100] serves as a relay for all devices [1, 2, 3] inside a WiFi bubble [101, 301, 401]

if these access points [100, 200, 300] are connected to each other via WiFi [101, 301, 401], (FIG. 4).

Figure 5:
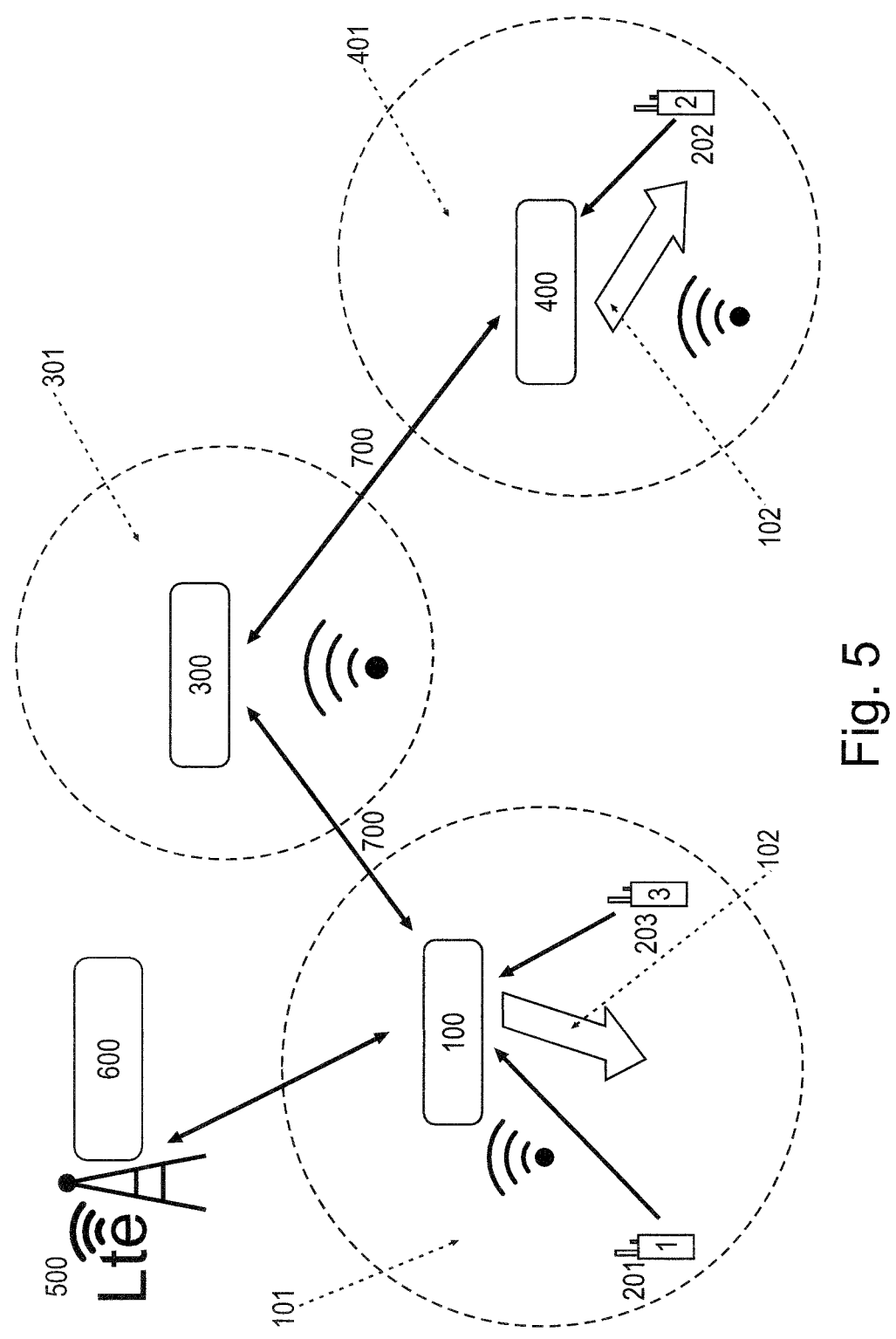
FIG. 5 shows a relay function, multicast.

Based on the present invention here, too, compliance with all ETSI TS 123 379 parameters is achieved by handling and answering all messages by the access point [100] with access to the LTE network and the server [600] and by opening a broadcast channel in all connected access points [100, 300, 400] (FIG. 5).

An effective implementation of the processes takes place when the access point [100, 300, 400] is able to take over all the necessary procedures for identity management (ETSI TS 124 382—MCPTT over LTE—identity management) for all MCPTT clients [201, 202, 203] logged into the access point; for this purpose, all the necessary data is exchanged when logging into the network of the access point [100, 300, 400].

The invention claimed is:

1. A system for providing communications services, comprising a first wireless communication network with a MCPTT infrastructure suitable for MC PTT communication and a relay which transmits the communication to a second wireless network in which terminals which participate in MCPTT communication are registered as MCPTT clients, wherein the relay takes over the data exchange necessary for setting up MCPTT voice communication, avoiding the MCPTT clients being involved in a data exchange with the MCPTT server, wherein the MCPTT voice communication taking place in the second network is based on a broadcast originating from the relay to all the terminals communicating in the second network, and wherein a process is shortened by terminating a first request at an access point by transmitting a "group call response" answer for all clients connected to the access point, and the access point opens a broadcast channel within a WiFi access point for a call.

2. A system for providing communications services, comprising a first wireless communication network with an MCPTT infrastructure suitable for MC PTT communication and a first relay transferring the communication to a second wireless network, and further relays interconnected by a third wireless network, and terminals not connected to the first wireless communication network but connected to a second wireless network in which they have registered, which participate in an MCPTT communication, wherein the relay with the connection to the first wireless network takes over a data exchange necessary for setting up the call, avoiding to include the MCPTT clients communicating in the respective second communication networks in this data exchange, wherein the MCPTT communication taking place in the second wireless networks is based on a broadcast from a respective relay to all terminals communicating in the second wireless networks, and wherein in a mobile network of access points with relay functionality when only one of several access points has access to the LTE network and the MCPPT server, the only one of the several access points functions as a relay for all devices inside a WiFi bubble when these access points are connected to each other via WiFi.

3. A system for providing communications services, comprising a first wireless communication network with an MCPTT infrastructure suitable for MC PTT communication and a relay which transmits the MCPTT communication to a second wireless network in which terminals which participate in MCPTT communication are registered, wherein the relay takes over all the necessary procedures for identity management of MCPTT clients, implemented in terminals, logged into an access point/relay; for this purpose, all necessary data is exchanged when logging into the network of the access point/relay, wherein the system complies with all ETSI TS 123 379 parameters by handling and answering all messages by the access point/relay with access to an LTE network and the server and by opening a broadcast channel in all connected access points, and wherein the access point/relay takes over all necessary procedures for identity management (ETSI TS 124 382-MCPTT over LTE-identity management) for all MCPTT clients logged into the access point/relay such that all necessary data is exchanged when logging into the LTE network of the access point/relay.

* * * * *